United States Patent [19]

Kawamura

[11] Patent Number: 5,115,772
[45] Date of Patent: May 26, 1992

[54] SYSTEM FOR ACTUATING VALVE IN STEPPED MOVEMENT

[75] Inventor: Hideo Kawamura, Koza, Japan

[73] Assignee: Isuzu Ceramics Research Institute Co., Ltd., Fujisawa, Japan

[21] Appl. No.: 571,529

[22] PCT Filed: Dec. 28, 1989

[86] PCT No.: PCT/JP89/01335

§ 371 Date: Nov. 13, 1990

§ 102(e) Date: Nov. 13, 1990

[87] PCT Pub. No.: WO90/07638

PCT Pub. Date: Jul. 12, 1990

[30] Foreign Application Priority Data

Dec. 28, 1988 [JP] Japan ............... 63-334960

[51] Int. Cl.⁵ ............................................. F01L 9/04
[52] U.S. Cl. ............................. 123/90.11; 251/129.01
[58] Field of Search .................... 123/90.11, 90.15; 251/129.01, 129.05, 129.09

[56] References Cited

U.S. PATENT DOCUMENTS

| | | | |
|---|---|---|---|
| 4,715,332 | 12/1987 | Kreuter | 123/90.11 |
| 4,829,947 | 5/1989 | Lequesne | 123/90.11 |
| 4,984,541 | 1/1991 | Kawamura | 123/90.11 |

FOREIGN PATENT DOCUMENTS

| | | | |
|---|---|---|---|
| 2616481 | 12/1988 | France | 123/90.11 |
| 0183805 | 10/1983 | Japan | 123/90.11 |
| 0195004 | 11/1983 | Japan | 123/90.11 |
| 0162312 | 9/1984 | Japan | 123/90.11 |
| 0006012 | 1/1985 | Japan | 123/90.11 |

Primary Examiner—David A. Okonsky
Assistant Examiner—Weilun Lo
Attorney, Agent, or Firm—Staas & Halsey

[57] ABSTRACT

A system for actuating a valve in stepped movement opens and closes intake and exhaust valves of an engine under electromagnetic forces generated by electromagnets. A magnetic body (3), which is reciprocally movable and has a plurality of tooth-like magnetic poles juxtaposed at equal intervals in the direction in which the magnetic body is reciprocally movable, is coupled to an intake/exhaust valve (8). A plurality of fixed magnetic poles (4c, 4d, 6c, 6d) are disposed in confronting relation to the tooth-like magnetic poles, the fixed magnetic poles being juxtaposed in the direction in which the magnetic body is reciprocally movable. The intake/exhaust valve (8) is opened and closed under electromagnetic attracting and repelling forces acting between the tooth-like magnetic poles and the fixed magnetic poles (4c, 4d, 6c, 6d). When the intake/exhaust valve (8) is opened and closed, the distance between the tooth-like magnetic poles and the fixed magnetic poles (4c, 4d, 6c, 6d) remains unchanged. Therefore, stable opening and closing forces are applied to the intake/exhaust valve.

10 Claims, 4 Drawing Sheets

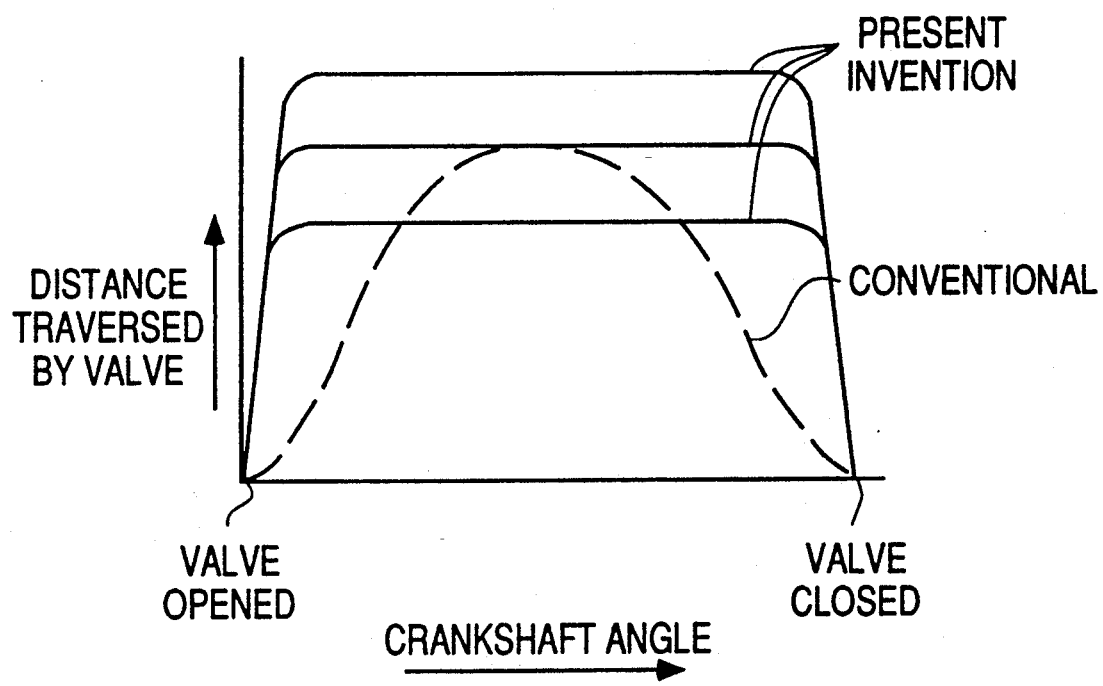

SYSTEM FOR ACTUATING VALVE IN STEPPED MOVEMENT

BACKGROUND OF THE INVENTION

1. Field of the Invention

The present invention relates to a system for actuating intake and exhaust valves in stepped movement with a linear stepping motor disposed on a stem end of the intake and exhaust valves of an engine.

2. Description of the Related Art

Some conventional actuating systems for opening and closing intake and exhaust valves includes a single camshaft which has cams for the intake and exhaust valves, the camshaft being disposed above or laterally by an engine. The camshaft is connected to the crankshaft of the engine by a belt or the like, so that the camshaft can rotate synchronously with the rotation of the engine. The valves have stems whose ends are pressed by cam surfaces of the camshaft through a link mechanism such as rocker arms or push rods. The intake and exhaust valves are normally closed by springs, and can be opened when their stem ends are pressed by the cam surfaces.

In other valve actuating systems, an intake camshaft having cams for acting on intake valves and an exhaust camshaft having cams for acting on exhaust valves are disposed above an engine. The intake and exhaust valves are opened when the stem ends of the intake valves are directly pushed by the cam surfaces of the intake camshaft and the stem ends of the exhaust valves are directly pushed by the cam surfaces of the exhaust camshaft.

However, the above conventional actuating systems for opening and closing intake and exhaust valves have several disadvantages. First, the conventional systems include camshafts and link mechanisms added to the engine. This necessarily renders the engine large in size.

Secondly, since the camshafts and the link mechanisms are driven by the output shaft of the engine, the engine output power is partly consumed by the frictional resistance produced when the camshafts and the link mechanisms are driven by the engine. As a result, the effective engine output power is reduced.

Finally, the timing with which the intake and exhaust valves are opened and closed cannot be altered during operation of the engine, but the valve opening and closing timing is preset such that the engine operates with high efficiency only when it rotates at a predetermined speed. Therefore, the engine output power and efficiency are lower when the engine rotates at a speed different from the predetermined speed.

To solve the above problems, there have been proposed valve actuating systems for opening and closing intake and exhaust valves under electromagnetic forces from electromagnets, rather than with camshafts, as disclosed in Japanese Laid-Open Patent Publications Nos. 58-183805 and 61-76713.

However, with the electromagnets disclosed in the above two publications, the distance between the electromagnet and the magnetic body varies when the intake and exhaust valves are actuated, resulting in an abrupt change in electromagnetic forces and highly unstable operation of the intake and exhaust valves.

SUMMARY OF THE INVENTION

In view of the aforesaid problems, it is an object of the present invention to provide a system for actuating a valve in stepped movement with a linear stepping motor disposed on a stem end of intake and exhaust valves, rather than with a camshaft, so that the valves can be opened and closed stably with respect to the movement thereof.

According to the present invention, there is provided a system for actuating intake and exhaust valves of an engine in stepped movement. The system has a magnetic body coupled to a valve which is reciprocally movable and has tooth-like magnetic poles juxtaposed at equal intervals in the direction in which the magnetic body moves. Electromagnets are provided which have fixed magnetic poles disposed confronting the tooth-like magnetic poles. The fixed magnetic poles are spaced at intervals different from the intervals of the tooth-like magnetic poles, but also in the direction in which the tooth-like magnetic poles are juxtaposed. Excitation coils are wound around the fixed magnetic poles, for generating magnetic lines of force through the fixed magnetic poles. Magnetic-line-of-force control means are provided to control the energization of the coils to produce combined electromagnetic forces acting between the tooth-like magnetic poles and the fixed magnetic poles in an opening direction, for driving the magnetic body.

In the system according to the present invention, the intake/exhaust valve is opened and closed under attractive and repelling forces acting between the tooth-like magnetic poles juxtaposed on the magnetic body coupled to the intake/exhaust valve and the fixed magnetic poles confronting the tooth-like magnetic poles. Since opening and closing forces acting on the intake/exhaust valve remain unchanged irrespective of movement of the intake/exhaust valve, stable opening and closing forces are applied to the intake/exhaust valve.

BRIEF DESCRIPTION OF THE DRAWINGS

FIG. 4 is a diagram showing the relationship between the crankshaft angle and the distance which the valve moves.

BEST MODE FOR CARRYING OUT THE INVENTION

An embodiment of the present invention will hereinafter be described in detail with reference to the drawings.

Figure 1:
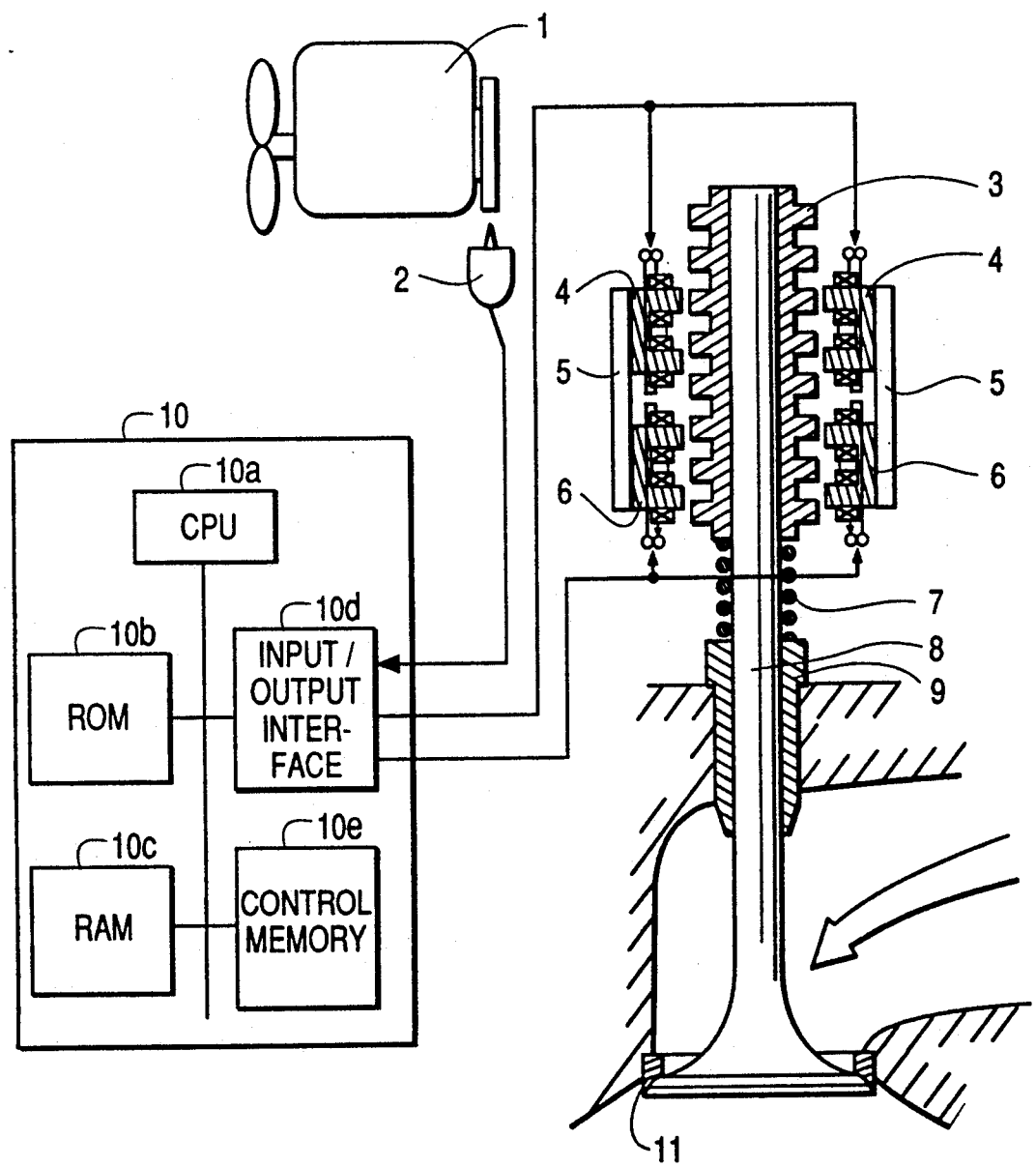
FIG. 1 is a block diagram showing a system for actuating a valve in stepped movement according to an embodiment of the present invention.
Figure 2:
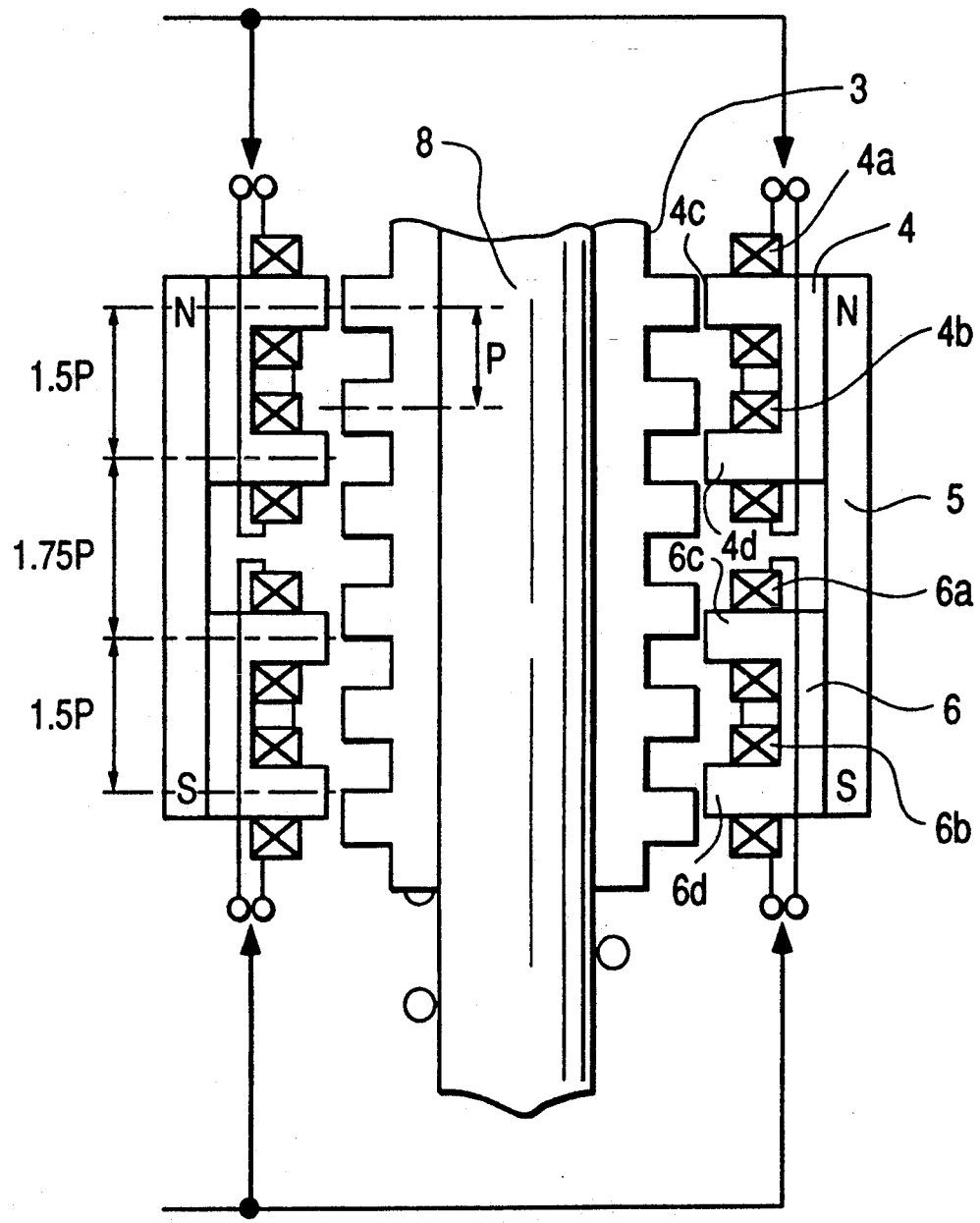
FIG. 2 is an enlarged view of the stem of the intake valve positioned within a scale of magnetic material having teeth and the surrounding electromagnets.

FIG. 1 is a block diagram showing an actuating system according to an embodiment of the present invention, and FIG. 2 is an enlarged view of the stem end of an intake valve.

In FIG. 1, an engine 1 has an output shaft, adjacent to which there is disposed a rotation sensor 2 for detecting the rotational speed and phase of the output shaft and converting the detected speed and phase into a signal. The engine 1 has intake and exhaust ports which are opened and closed by intake and exhaust valves, respectively. Of these intake and exhaust valves, the intake valve will mainly be described below.

An intake valve 8 is made of a highly strong and lightweight material such as ceramic. The intake valve 8 has a stem axially slidably supported by a valve guide 9. A valve seat 11 is mounted in the intake port of an intake passage. The intake port is closed when the head of the intake valve 8 is closely held against the valve seat 11. The stem end of the intake valve 8 is fitted in a scale 3 which is made of a magnetic material having teeth on its peripheral surface at a pitch P, the teeth serving as magnetic poles.

Around the scale 3, there are disposed left and right upper electromagnets 4. As shown in FIG. 2, the left and right upper electromagnets 4 each have fixed magnetic poles 4c, 4d spaced from each other by a distance of 1.5 P. The left and right lower electromagnets 6 each have fixed magnetic poles 6c, 6d spaced from each other at a distance of 1.5 P, the upper and lower electromagnets 4, 6 being spaced from each other by a distance of 1.75 P. The upper and lower electromagnets 4, 6 are joined to each other by permanent magnets 5.

Coils 4a, 4b, 6a, 6b are disposed respectively around the fixed magnetic poles 4c, 4d, 6c, 6d. The coils on the fixed magnetic poles 4c, 4d and the coils on the fixed magnetic poles 6c, 6d are respectively connected in series with each other.

The upper electromagnets 4 on the lefthand and righthand sides of the intake valve 8 are connected such that they are supplied with same electric power signal, and the left and right lower electromagnets 6 are also connected such that they are supplied with the same electric power signal.

A spring 7 is disposed between the slider 3 and the valve guide 9 for preventing the intake valve 8 from dropping when the electromagnets are de-energized.

A control unit 10 has an input/output interface 10d connected to the upper and lower electromagnets 4, 6 by wires supplying the electric power signal to the upper and lower electromagnets 4, 6. The rotation sensor 2 is also connected to the input/output interface 10d. The control unit 10 also includes a RAM 10c for temporarily storing data and the results of arithmetic operations, a ROM 10b for storing a program and various relation maps, a CPU 10a for effective arithmetic operations according to the program stored in the ROM 10b, and a control memory 10e for controlling the flow of signals in the control unit 10.

Operation of the actuating system according to the present invention will be described below.

FIGS. 3(a) through 3(e) show the conditions of magnetic lines of force at the stem end of the intake valve 8.

FIGS. 3(a) through 3(e) illustrate the righthand portion of the intake valve 8. Those of the coils 4a, 4b, 6a, 6b which are energized are indicated by the solid lines, and those which are de-energized are indicated by the broken lines.

Figure 3A:
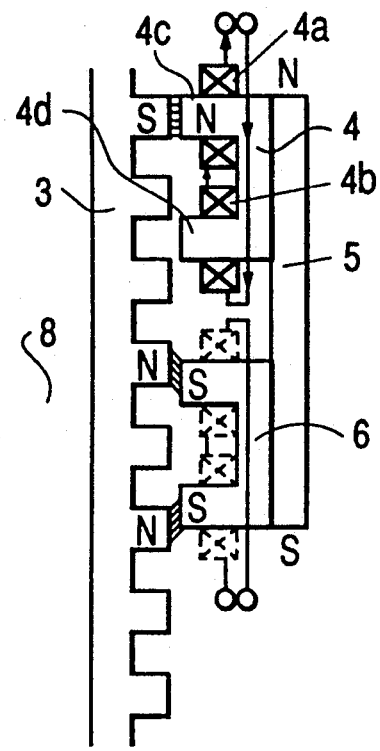
FIGS. 3(a) through 3(e) are diagrams showing the conditions of magnetic lines of force at the time the valve is moved.

In the position of FIG. 3(a) where the intake valve is being closed from the open condition, only the upper electromagnet 4 is energized.

The upper electromagnet 4 is energized in a direction to produce an N (North) pole on the tip of the fixed magnetic pole 4c. The coils 4a, 4b of the upper electromagnet 4 are connected in series to each other. Since, however, the magnetic lines of force generated by the fixed magnetic poles 4c, 4d are oriented in opposite directions upon energization of the upper electromagnet 4, the magnetic lines of force generated by the coil 4b cancel out the magnetic lines of force generated by the permanent magnet 5, and no pole is produced on the tip of the fixed magnetic pole 4d.

The magnetic lines of force generated by the coil 4a are in the same direction as the magnetic lines of force generated by the permanent magnet 5, so that an N pole is produced on the tip of the fixed magnetic pole 4c, and an S (South) pole is produced on the tooth of the scale 3 which confronts the fixed magnetic pole 4c.

At this time, the coils 6a, 6b of the lower electromagnet 6 are not de-energized. As the shortest distance between the fixed magnetic pole 6c and the tooth of the scale 3 is equal to the shortest distance between the fixed magnetic pole 6d and the tooth of the scale 3, both the fixed magnetic poles 6c, 6d produce S poles of the same strength.

Figure 3B:
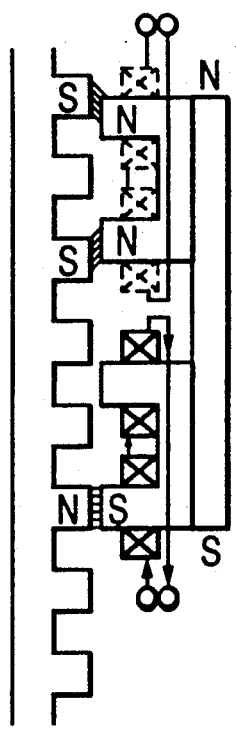

Then, as shown in FIG. 3(b), the upper electromagnet 4 is de-energized, and the coils 6a, 6b of the lower electromagnet 6 are energized in a direction to produce an S pole on the tip of the fixed magnetic pole 6d. Since the coils 6a, 6b are connected such that the magnetic lines of force generated by the fixed magnetic poles 6c, 6d upon energization of the coils 6a, 6b are oriented in opposite directions, no pole is produced on the tip of the fixed magnetic pole 6c. Therefore, as shown, a stable condition is reached in the position in which the fixed magnetic pole 6d and the tooth of the scale 3 confront each other. This position is reached when the scale 3 has moved from the position shown in FIG. 3(a) upwardly by a distance of ¼ P.

Figure 3C:
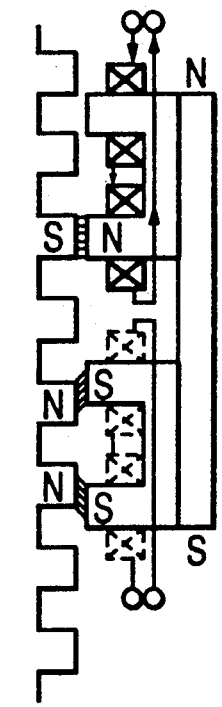

Next, as shown in FIG. 3(c), the lower electromagnet 6 is de-energized, and the upper electromagnet 4 is energized in a direction to produce an N pole on the tip of the fixed magnetic pole 4d. This direction of energization is opposite to the direction of energization shown in FIG. 3(a). Now, a stable condition is reached in a position in which the fixed magnetic pole 4d and the tooth of the scale 3 confront each other, i.e., when the scale 3 has moved from the position shown in FIG. 3(b) upwardly by a distance of ¼ P.

Figure 3D:
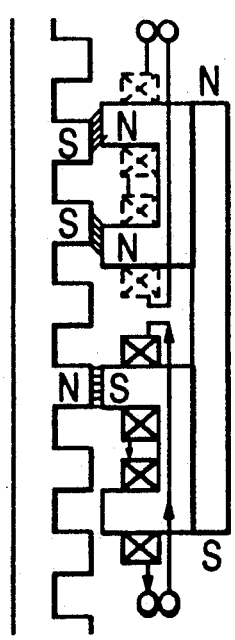

Then, as shown in FIG. 3(d), the upper electromagnet 4 is de-energized, and the lower electromagnet 6 is energized in a direction to produce an S pole on the tip of the fixed magnetic pole 6c, i.e., in a direction opposite to the direction shown in FIG. 3(b). The scale 3 now moves upwardly by a distance of ¼ P, and a stable condition is reached in a position in which the fixed magnetic pole 6c and the tooth of the scale 3 confront each other.

Figure 3E:
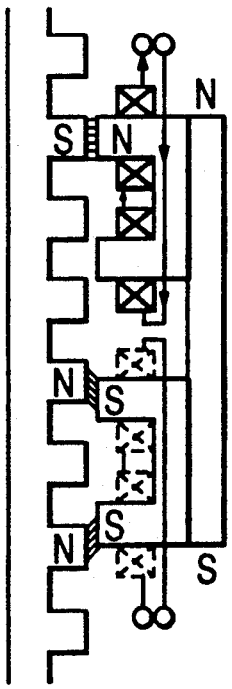

Lastly, as shown in FIG. 3(e), the electromagnets are energized in the same manner as shown in FIG. 3(a), reaching a stable condition in a position in which the fixed magnetic pole 4c and the tooth of the scale 3 confront each other.

Through execution of the above steps shown in FIGS. 3(a) through 3(e), the scale 3 moves upwardly by a distance of P. The above steps may be repeated to move the scale 3 upward, or reversed to move the intake valve 8 downward.

FIG. 4 shows the relationship between the crankshaft angle and the distance traversed by the valve.

The horizontal axis of the graph indicates the crankshaft angle, and the vertical axis indicates the distance by which the valve moves. The relationship achieved by the inventive system is indicated by the solid-line curves, and the relationship achieved by the conventional system is indicated by the broken-line curve.

When the crankshaft angle detected by the rotation sensor 2 reaches the timing to open the valve, the valve is controlled so as to move in the opening direction. When the timing to close the valve is reached, the valve is controlled to be seated on the valve seat 11.

When a valve is actuated by the conventional cam, the movement of the valve is uniquely and inflexibly determined. According to the present invention, however the distance traversed by the valve can be varied as desired as illustrated.

The ROM 10b may store a map of engine rotational speeds and distances traversed by the valve. The distance traversed by the valve can be varied depending on the engine rotational speed detected by the rotation sensor 2, using the map. Since a plurality of valves in a multicylinder engine can individually be controlled, the number of cylinders that are in operation can be increased or reduced depending on the rotational speed of the engine.

While the intake valve has been described above, the actuating system of the present invention is also applicable to the exhaust valve, which is omitted from illustration.

Although a certain preferred embodiment has been shown and described, it should be understood that the present invention should not be limited to the illustrated embodiment but many changes and modifications may be made therein without departing from the scope of the appended claims.

As described above, the system for actuating a valve in stepped movement according to the present invention can be used as a system for actuating intake and exhaust valves of an engine, and suitable for use with an engine which is required to vary the timing to open and close the intake and exhaust valves depending on changes in an operating condition such as the engine rotational speed.

I claim:

1. A system for actuating a valve, such as an intake and exhaust valve of an engine, in stepped movement, comprising:
    a magnetic body coupled to the valve, said magnetic body being mounted for reciprocating movement with said valve and having a plurality of tooth-like magnetic poles juxtaposed at closely spaced equal intervals in the direction in which the magnetic body is reciprocally movable;
    a plurality of fixed magnetic poles confronting said tooth-like magnetic poles, said fixed magnetic poles being closely spaced at intervals different from the intervals of said tooth-like magnetic poles in the direction in which the tooth-like magnetic poles are juxtaposed;
    excitation coils wound around said fixed magnetic poles, for generating magnetic lines of force through said fixed magnetic poles; and
    energization control means for energizing said excitation coils to open and close said valve by attracting to appropriate ones of said plurality of fixed magnetic poles, closely provided ones of said plurality of tooth-like magnetic poles.

2. A system according to claim 1, wherein said valve is made of ceramic.

3. A system according to claim 1, wherein said energization control means produces combined electromagnetic forces acting between said tooth-like magnetic poles and said fixed magnetic poles in an opening direction, thereby lessening shocks produced when the valve is seated.

4. A system according to claim 1, wherein the timing established by said energization control means to open and close the valve is variable as the rotational speed of the engine (1) varies.

5. A valve control system in an engine, comprising:
    electromagnets having coils and having a series of magnetic poles;
    a valve having a magnetic scale with a series of teeth which confront the series of magnetic poles on said electromagnets;
    control means for controlling movement of said valve in a stepped fashion by energizing and deenergizing the coils of said electromagnets at timings corresponding to a speed of the engine, to attract to appropriate ones of said magnetic poles, closely provided ones of said series of teeth on said valve.

6. A valve control system according to claim 5, further comprising speed detection means for detecting a speed of the engine, and
    said control means comprising a control unit including an input/output interface connected to said electromagnets and said speed detection means, a storage means for storing a table of the timings corresponding to different speeds of the engine, and a processor calculating the timing based on the speed detected by said detection means.

7. A valve control system in an engine comprising:
    electromagnets having coils and having a series of magnetic poles;
    a valve having a magnetic scale with a series of teeth which confront the series of magnetic poles on said electromagnets;
    control means for controlling movement of said valve in a stepped fashion by energizing and deenergizing the coils of said electromagnets at timings corresponding to a speed of the engine; and
    speed detection means for detecting a speed of the engine, and
    said control means comprising a control unit including an input/output interface connected to said electromagnets and said speed detection means, a storage means for storing a table of the timings corresponding to different speeds of the engine, and a processor calculating the timing based on the speed detected by said detection means, wherein said electromagnets comprise an upper electromagnet and a lower electromagnet, each separately connected to the input/output interface and separately controlled by the control unit, and said control means moves said valve upwardly and downwardly by energizing and deenergizing the upper and lower electromagnets and attracting and repelling the teeth confronting the magnetic poles.

8. A method of controlling a valve in an engine, said valve having a magnetic scale with teeth confronting magnetic poles of an electromagnet, comprising the steps of:
    (a) detecting the speed of the engine;
    (b) reading the speed of the engine into a computer; and
    (c) energizing and deenergizing the electromagnets at timings corresponding to the speed of the engine, to move said valve by attracting and repelling the teeth on the magnetic scale, under the control of the computer, by attracting to appropriate ones of the magnetic poles, closely provided ones of the teeth on said valve.

9. A method according to claim 8, wherein said energizing and deenergizing of the electromagnets in step (c) is performed at timings read by the computer from a preset speed/timing table based on the speed.

10. A method according to claim 9, wherein the electromagnets including an upper electromagnet and a lower electromagnet, and wherein step (c) further comprises the steps of (c1) holding the valve closed by energizing the upper electromagnet, (c2) opening the valve by a step by deenergizing the upper electromagnet and energizing the lower electromagnet (c3) opening the valve by another step by energizing the upper electromagnet and deenergizing the lower electromagnet, (c4) opening the valve by any number of steps by repeating steps (c2) and (c3), and (c5) closing the valve by reversing the steps (c1 to c3).

* * * * *